United States Patent [19]

Toyozawa et al.

[11] Patent Number: 5,963,007
[45] Date of Patent: Oct. 5, 1999

[54] CURRENT CONTROL METHOD FOR AN AC SERVOMOTOR

[75] Inventors: Yukio Toyozawa, Kikuchi-gun; Naoto Sonoda, Kamimashiki-gun, both of Japan

[73] Assignee: Fanuc, Ltd., Yamanashi, Japan

[21] Appl. No.: 08/981,452

[22] PCT Filed: Apr. 28, 1997

[86] PCT No.: PCT/JP97/01479

§ 371 Date: Dec. 22, 1997

§ 102(e) Date: Dec. 22, 1997

[87] PCT Pub. No.: WO97/41634

PCT Pub. Date: Nov. 6, 1997

[30] Foreign Application Priority Data

Apr. 26, 1996 [JP] Japan .................................. 8-129303

[51] Int. Cl.$^6$ ....................................................... H02P 5/41
[52] U.S. Cl. ........................ 318/799; 318/800; 318/808; 318/677
[58] Field of Search ..................... 318/560–680, 318/798–815

[56] References Cited

U.S. PATENT DOCUMENTS

| | | | |
|---|---|---|---|
| 4,451,771 | 5/1984 | Nagase et al. | 318/800 |
| 4,575,667 | 3/1986 | Kurakake | 318/803 |
| 5,021,724 | 6/1991 | Hirano et al. | 318/800 |
| 5,200,682 | 4/1993 | Kim et al. . | |
| 5,329,217 | 7/1994 | Kerkman et al. | 318/811 |
| 5,448,150 | 9/1995 | Yamamoto et al. | 318/805 |
| 5,459,386 | 10/1995 | Okachi et al. | 318/727 |
| 5,467,000 | 11/1995 | Bauer et al. . | |
| 5,481,172 | 1/1996 | Minowa et al. | 318/800 |
| 5,644,206 | 7/1997 | Yura | 318/807 |
| 5,747,957 | 5/1998 | Hayashida | 318/799 |

FOREIGN PATENT DOCUMENTS

| | | |
|---|---|---|
| 0 633 653 | 1/1995 | European Pat. Off. . |
| 64-50790 | 2/1989 | Japan . |
| 6-153569 | 5/1994 | Japan . |
| 8-275599 | 10/1996 | Japan . |

OTHER PUBLICATIONS

H. Huy, et al., "Analysis and Implementation . . . Servo Drives", *IEEE Transactions on Industrial Electronics*, 41 (1994), No. 1, pp. 110–117.
C. Kao, et al, "Induction Machine Control . . . Saturation", *1994 IEEE*, pp. 250–258.
M. Bodson, et al., "Nonlinear Servo Control . . . Satuation", *1994 IEEE*, pp. 1832–1837.

*Primary Examiner*—David Martin
*Attorney, Agent, or Firm*—Staas & Halsey, LLP

[57] ABSTRACT

A d-phase current in the direction of a magnetic flux generated by a field system and a q-phase current in a direction perpendicular thereto are obtained from a driving current and a rotor phase of an AC servomotor by d-q conversion. DC-mode current control is carried out with this d-phase current adjusted to zero and using the q-phase current as a current command. In this DC-mode current control, the influence of magnetic saturation is restrained to lessen torque reduction by advancing the phase of the q-phase current command, which is effective component of the current command, in case of magnetic saturation.

4 Claims, 9 Drawing Sheets

CURRENT CONTROL METHOD FOR AN AC SERVOMOTOR

TECHNICAL FIELD

The present invention relates to a current control method for an AC servomotor for use as a drive source for a machine, such as a machine tool, industrial machine, etc., apparatus, and robot that are controlled by an NC device or the like.

BACKGROUND ART

Referring to the block diagram of FIG. 14, an example of a conventional control system for an AC servomotor will be described.

A position deviation is obtained by subtracting a position feedback value detected by an encoder or the like from a position command, and a velocity command is obtained by multiplying the position deviation by a position gain (POSITION CONTROL 1). A velocity deviation is obtained by subtracting a velocity feedback value from the obtained velocity command, and a torque command (current command) is obtained by a process such as proportional-plus-integral control (VELOCITY CONTROL 2). Further, a current deviation is obtained by subtracting a current feedback value from the obtained torque command, and a voltage command for each phase is obtained by a process such as proportional-plus-integral control (CURRENT CONTROL 3). An AC servomotor 4 is controlled by carrying out PWM control or the like in accordance with this voltage command.

Generally, three phase currents are controlled separately for individual phases in a current loop of a control system for a three-phase AC servomotor. Referring now to FIG. 15, therefore, a current loop process for thus separately controlling the three phase currents will be described.

Current commands for the individual phases are obtained by multiplying the torque command (current command) obtained in the VELOCITY CONTROL 2 by sine waves that deviates from a rotor phase θ of the servomotor, detected by an encoder or the like, by a margin corresponding to an electrical angle of $2\pi/3$ with respect to U-, V- and W-phases. Current deviations are obtained by subtracting actual currents Iu, Iv and Iw for the individual phases, detected by means of a current detector, from the obtained current commands. Proportional-plus-integral (PI) control or the like is carried out by current controllers 5u, 5v and 5w for the individual phases, and command voltages Eu, Ev and Ew for the individual phases are delivered to a power amplifier 6. The power amplifier 6 shown in FIG. 15 carries out PWM control by means of an inverter or the like, and supplies the currents Iu, Iv and Iw for the individual phases to the servomotor 4, thereby driving it. This current control system is called an AC system.

In general, magnetic saturation is caused in a magnetic circuit in an AC servomotor if the current supplied to the motor is increased. Due to this magnetic saturation, the torque constant tends to be lowered despite the substantial current supply, so that it is hard to obtain a desired torque.

Referring now to FIG. 16, the relation between supply current and torque will be described.

If no magnetic saturation is caused in the magnetic circuit in the motor, a torque T that is generated with increase of the supply current increases with a torque constant kt. In the case where magnetic saturation is caused when Iq exceeds the supply current, in contrast with this, the maximum torque (indicated by broken line in the drawing) that can be generated by the motor becomes lower than a torque value to be determined on the basis of the torque constant kt, and the obtained torque is not higher than the maximum torque indicated by broken line in the drawing.

If the magnetic saturation is corrected by the convention AC-system current control, high-speed rotation results in a substantial phase delay even though it is constant-speed rotation. According to the current control of the AC servomotor based on the AC system, it is difficult to carry out control with a correction value for the magnetic saturation separated from a phase delay.

Compared with this AC-system current control, there is a system in which the three phase currents of the motor are converted into two phases, d- and q-phases, by d-q conversion, a d-phase current Id in the direction of a magnetic flux that is generated by a field system is controlled so as to be zero, and the level of only a q-phase current Iq in a direction perpendicular to the current Id is controlled as in the case of a DC servomotor. This system is more improved than the AC system in that it is free from the problem of phase delay because the current is controlled as a direct current. Nevertheless, the problem of the magnetic saturation still remains, and the output torque is lowered under the influence of the magnetic saturation as the current commands are enhanced.

Disclosure of the Invention

The object of the present invention is to provide a current control method for an AC servomotor, whereby the influence of magnetic saturation is restrained to lessen torque reduction when a large current is supplied to the AC servomotor.

In order to achieve the above object, a current control method for an AC servomotor according to the present invention comprises obtaining a d-phase current in the direction of a magnetic flux generated by a field system and a q-phase current in a direction perpendicular thereto from a driving current and a rotor phase of the AC servomotor by d-q conversion, adjusting a d-phase current command to zero, setting a q-phase current command as a torque command to be delivered from a velocity loop, obtaining a d-phase command voltage from the d-phase current command and the d-phase current, obtaining a q-phase command voltage from the q-phase current command and the q-phase current, converting the d- and q-phase command voltages into three phase voltages, and obtaining three phase currents to be supplied to the motor from the three phase voltages. The phase of the q-phase current command is advanced for an angle corresponding to the value of the q-phase current command.

According to the present invention, there may be provided a magnetic saturation correction system for an AC servomotor, whereby the influence of magnetic saturation is restrained to lessen torque reduction when a large current is supplied.

BEST MODE FOR CARRYING OUT THE INVENTION

In a magnetic saturation correction method for an AC servomotor according to the present invention, a DC system is used to carry out current control for the motor by d-q conversion. The following is a description of a current control based on d-q conversion.

Figure 1:
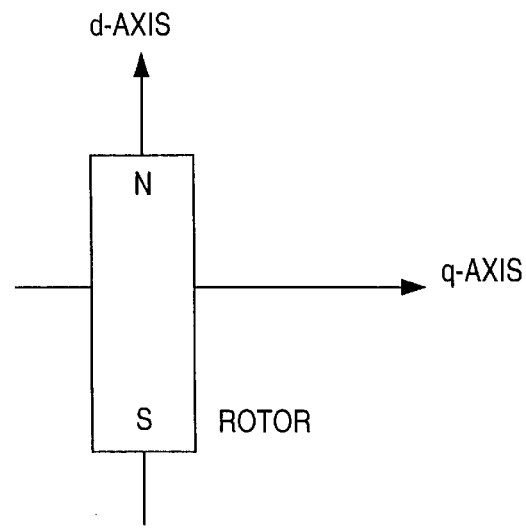
FIG. 1 is a diagram for illustrating a coordinate system for d-q conversion.

According to a current control system based on d-q conversion, three phase currents are converted into two phases, d- and q-phases, by d-q conversion, and the individual phases are controlled thereafter. In the d-q conversion, a d-axis is generally taken extending in the direction of a magnetic flux that is generated by a field system. As shown in FIG. 1, a d-axis is taken extending in the direction of the magnetic flux of a permanent magnet of a rotor, while a q-axis is taken extending in the direction perpendicular to the d-axis.

The following is a description of the current control that utilizes such a d-q conversion. The following expression (1) is a circuit equation of a three-phase synchronous motor.

$$\begin{bmatrix} Vu \\ Vv \\ Vw \end{bmatrix} = \begin{bmatrix} R+sL' & -(1/2)sM' & -(1/2)sM' \\ -(1/2)sM' & R+sL' & -(1/2)sM' \\ -(1/2)sM' & -(1/2)sM' & R+sL' \end{bmatrix} \begin{bmatrix} Iu \\ Iv \\ Iw \end{bmatrix} + \begin{bmatrix} eu \\ ev \\ ew \end{bmatrix} \quad (1)$$

In the above expression (1), Vu, Vv and Vw on the left side are U-, V- and W-phase voltages of the motor, respectively. The left-hand matrix in the first term on the right side of the equation is an impedance matrix, in which R is the resistance of a winding, L' is the self-inductance of the winding, M' is a mutual inductance, and s is a differential operator. If Ia is a leakage inductance, there is a relation L'=Ia+M'. The right-hand matrix in the first term on the right side represents the respective vectors of U-, V- and W-phase currents Iu, Iv and Iw. The matrix in the second term on the right side represents electromotive forces eu, ev and ew that are induced by U-, V- and W-phase windings, respectively.

The following expression (4) for carrying out a d-q conversion can be obtained by transforming the aforesaid expression (1) by using an exchange matrix C1 for transforming a three-phase AC coordinate system into a two-phase AC coordinate system represented by the following expression (2) and an exchange matrix C2 which transforms the two-phase AC coordinate system represented by the following expression (3) into a rotation coordinate system:

$$C1 = \sqrt{2/3} \begin{bmatrix} 1 & -1/2 & -1/2 \\ 0 & \sqrt{3/2} & -\sqrt{3/2} \end{bmatrix} \quad (2)$$

$$C2 = \begin{bmatrix} \cos\theta & \sin\theta \\ -\sin\theta & \cos\theta \end{bmatrix} \quad (3)$$

In the above expression (3), θ is an electrical angle (expressed by a angle of the field system in the clockwise direction with respect to the u-phase winding) of the rotor.

$$\begin{bmatrix} Vd \\ Vq \end{bmatrix} = \begin{bmatrix} R+PL & -\omega L \\ \omega L & R+PL \end{bmatrix} \begin{bmatrix} Id \\ Iq \end{bmatrix} + \begin{bmatrix} 0 \\ \omega\phi \end{bmatrix} \quad (4)$$

In the above expression (4), ω is the angular velocity (expressed by a mechanical angle) of the rotor, and Φ is the maximum value of the number of interlinked magnetic fluxes of the windings. Also, there is a relation L=1a+3M'/2.

As seen from the aforesaid expression (4), the AC servomotor can be controlled in the same manner as a DC servomotor if a d-phase current Id in the direction of the magnetic flux generated by the field system is controlled so as to be "0" and the level of only a q-phase current Iq is controlled.

Figure 2:
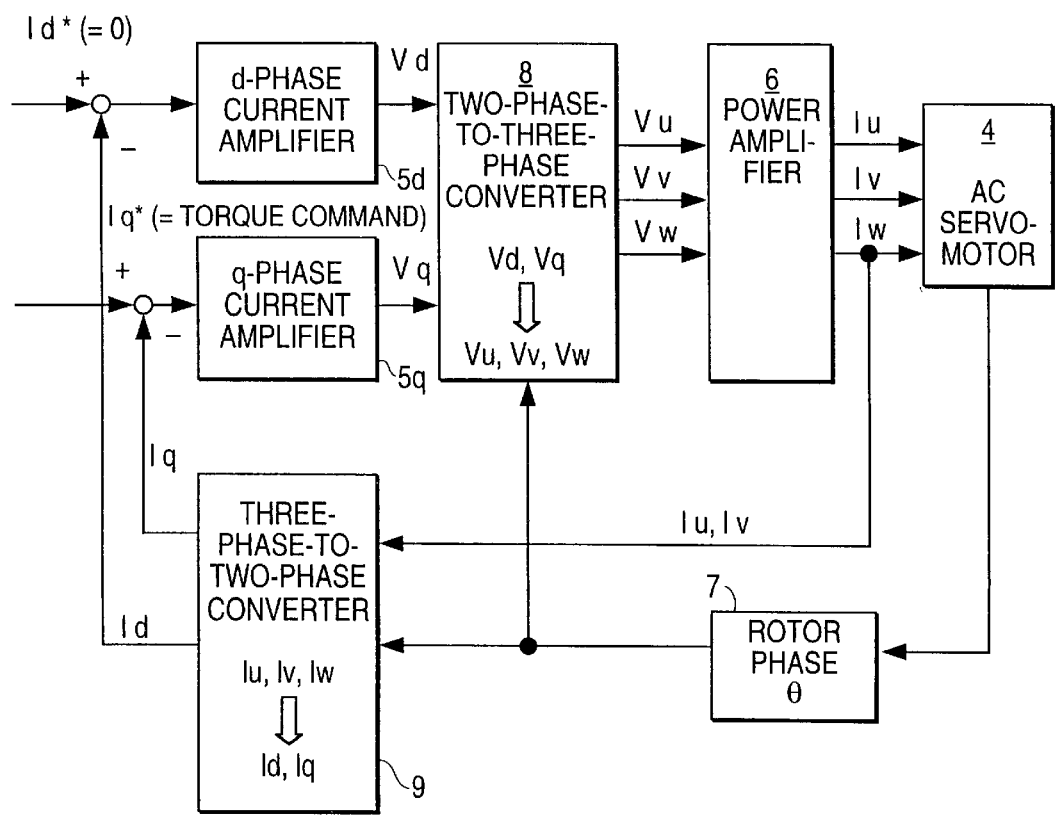
FIG. 2 is a block diagram for a current control section for carrying out current control by d-q conversion.

The block diagram of FIG. 2 shows an example of prior art which controls the AC servomotor by d-q conversion.

In the control of the AC servomotor shown in FIG. 2, a d-phase current command Id* is adjusted to "0", and a q-phase current command Iq* is used as a torque command to be delivered from a velocity loop. From the actual currents Iu and Iv for any two phases (e.g., U- and V-phases), out of the U-, V- and W-phases of the motor, and the phase θ of the rotor detected by a rotor position detector, the d- and q-phase currents Id and Iq are obtained by using device 9 for converting three phase currents into two phase currents.

By subtracting the d- and q-phase currents Id and Iq, outputs from the converter means 9, from the d- and q-phase current commands Id* (=0) and Iq* (torque command), d- and q-phase current deviations (−Id; Iq* −Iq) are individually obtained and are applied to d- and q-phase current controllers 5d and 5q, respectively. The current controllers 5d and 5q carry out proportional-plus-integral control in the same manner as in the conventional case, and output d- and q-phase command voltages Vd and Vq, respectively. A unit 8 for converting two phase currents into three phase currents receives these d- and q-phase command voltages Vd and Vq, and outputs the U-, V- and W-phase command voltages Vu, Vv and Vw. A power amplifier 6 receives the command voltages Vu, Vv and Vw, and delivers the U-, V- and W-phase currents Iu, Iv and Iw to the servomotor 4. An inverter or the like of the servomotor 4 supplies the currents Iu, Iv and Iw for the U-, V- and W-phases, thereby controlling the servomotor.

Based on the transformation matrixes C1 and C2 of the aforesaid expressions (2) and (3) and relations such that the total sums of the three phase voltages and currents are "0", that is, Vu+Vv+Vw=0 and Iu+Iv+Iw=0, relation between the three phase voltages Vu, Vv and Vw and the two phase voltages Vd and Vq are given by the following expression (5) and relation between the three phase currents Iu, Iv and Iw and the two phase currents Id and Iq are given by the following expression (6):

$$\begin{bmatrix} Vu \\ Vv \\ Vw \end{bmatrix} = C1^T C2^T \cdot \begin{bmatrix} Vd \\ Vq \end{bmatrix} = \qquad (5)$$

$$\sqrt{2}/3 \begin{bmatrix} \cos\theta & -\sin\theta \\ \cos(\theta - 2\pi/3) & -\sin(\theta - 2\pi/3) \\ \cos(\theta + 2\pi/3) & -\sin(\theta + 2\pi/3) \end{bmatrix} \cdot \begin{bmatrix} Vd \\ Vq \end{bmatrix}$$

$$\begin{bmatrix} Id \\ Iq \end{bmatrix} = C2 \cdot C1 \begin{bmatrix} Iu \\ Iv \\ Iw \end{bmatrix} = \sqrt{2} \begin{bmatrix} \sin(\theta + \pi/3) & \sin\theta \\ \cos(\theta + \pi/3) & \cos\theta \end{bmatrix} \cdot \begin{bmatrix} Iu \\ Iv \end{bmatrix} \qquad (6)$$

Accordingly, the three-phase-to-two-phase converter 9 of FIG. 2 carries out computation of the above expression (6), thereby obtaining the two phase currents Id and Jq from two (Iu and Iv in the example of FIG. 2) of the three phase currents Iu, Iv and Iw, and uses them individually as d- and q-phase current feedback values. Also, the two-phase-to-three-phase converter 8 carries out computation of the aforesaid expression (5), thereby obtaining the three phase currents Vu, Vv and Vw from the two phase voltages Vd and Vq. Thus, the current control of the servomotor can be carried out by utilizing the d-q conversion.

Referring now to the block diagram of FIG. 3, a current control section of the AC servomotor according to the present invention will be described.

Figure 3:
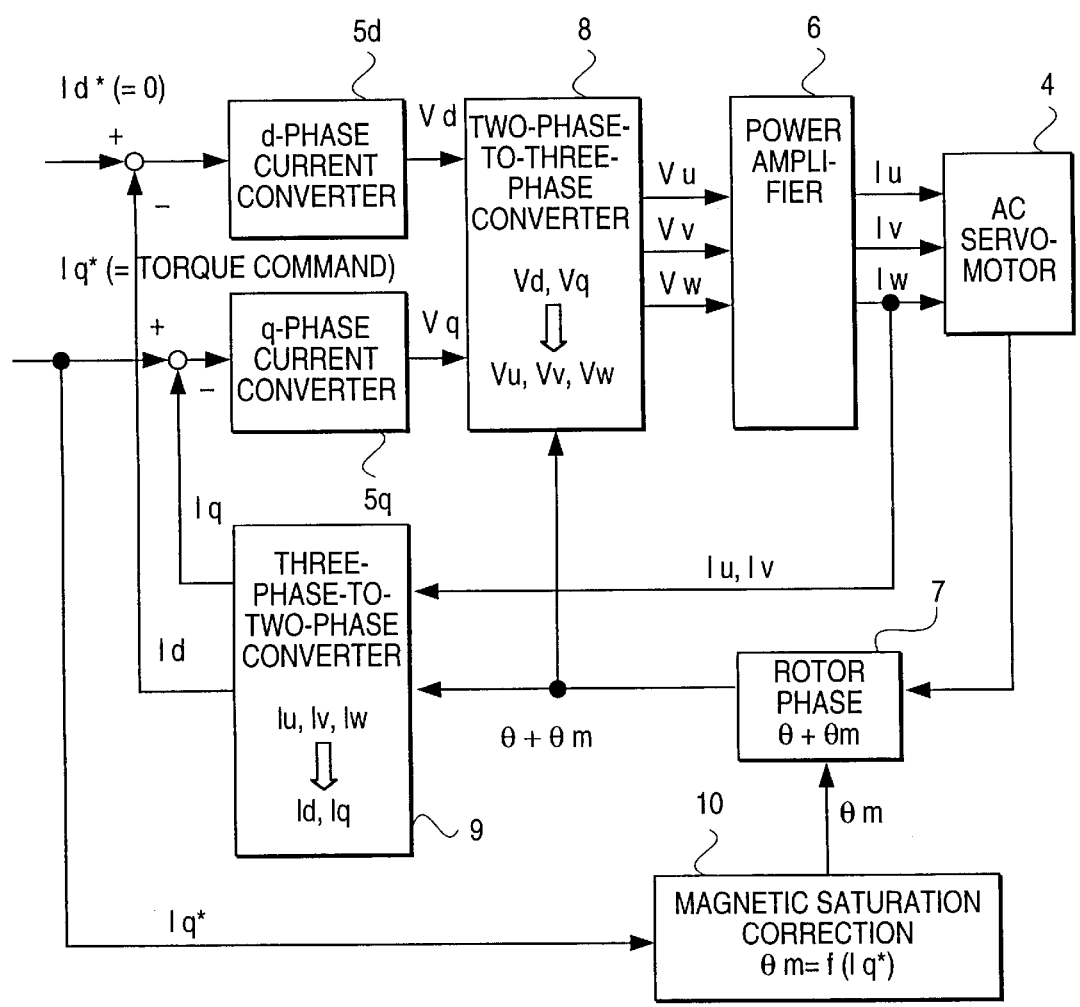
FIG. 3 is a block diagram for illustrating an example of a configuration for carrying out a current control method for an AC servomotor according to the present invention.

The block diagram of FIG. 3, compared with the block diagram of FIG. 2, additionally contains a magnetic saturation correction block 10, which receives the torque command Iq* and delivers a lead angle θm corresponding to the torque command value to a block 7 for obtaining the rotor phase.

In the block diagram shown in FIG. 3, the d-phase current command Id* is adjusted to "0", and the q-phase current command is used as torque command Iq* to be delivered from a velocity loop. The magnetic saturation correction block 10 obtains a lead angle θm from the torque command Iq*, and applies this lead angle θm to the rotor phase block 7. The rotor phase block 7 corrects the rotor phase θ, detected by means of the rotor position detector of the AC servomotor, by adding the lead angle θm to the rotor phase θ (θ+θm). Further, the three-phase-to-two-phase converter 9 receives two (Iu and Iv in the example of FIG. 3) of the three phase currents Iu, Iv and Iw and the phase-corrected phase angle (θ+θm), and obtains the d- and q-phase currents Id and Iq from these values by the d-q conversion and outputs them.

The d-phase current controller 5d is supplied with a value obtained by subtracting the d-phase current Id from the d-phase command current Id* (=0), the q-phase current controller 5q is supplied with a value obtained by subtracting the q-phase current Iq from the q-phase command current (torque command Iq*), and thereafter, the current control is carried out in the same manner as in the case of FIG. 2.

Figure 4:
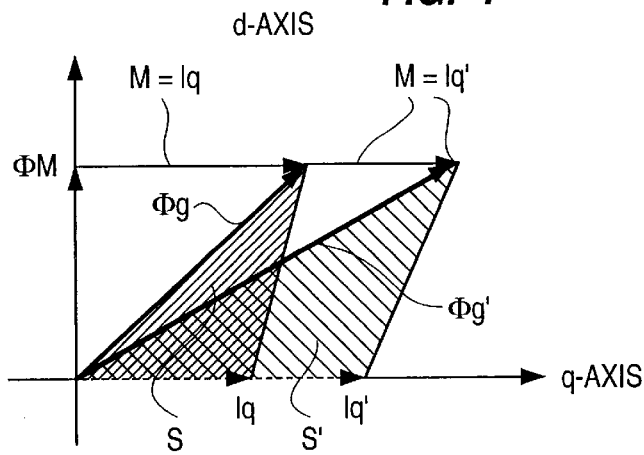
FIGS. 4 to 6 are diagrams showing magnetic flux vectors on d-q coordinates of the motor.
Figure 5:
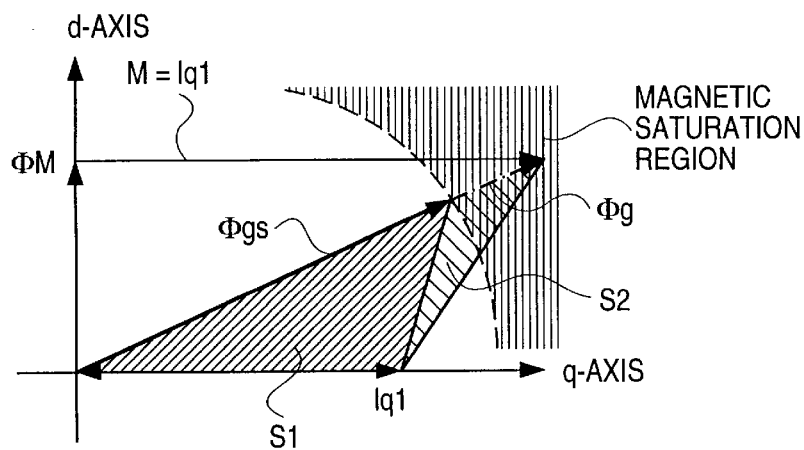
Figure 6:
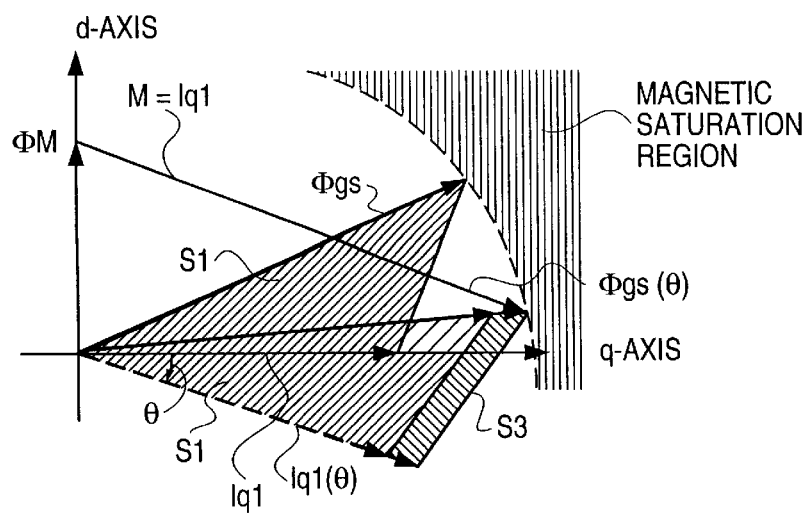

Referring now to FIGS. 4, 5 and 6, magnetic saturation correction according to the present invention will be described.

FIGS. 4, 5 and 6 are diagrams showing magnetic flux vectors on d-q coordinates of the motor, in which the d-axis corresponds to the direction of the magnetic flux (main magnetic flux ΦM) of the permanent magnet of the rotor and the q-axis corresponds to the direction of a magnetic flux M·Iq that is generated by an effective current Iq, as in the case of FIG. 1. The d-axis and the q-axis cross at right angles to each other.

If the vector of the main magnetic flux ΦM on the rotor side and the vector of the stator-side magnetic flux M·Iq generated by the effective current Iq are synthesized, the resultant magnetic flux vector serves as an effective magnetic flux Φg for the formation of torque. Further, a torque T generated at this time is obtained from the outer product of the effective magnetic flux Φg and the effective current Iq. Thus, we obtain $$\Phi g = \Phi M + M \cdot Iq,$$

$$T = \Phi g \times Iq. \qquad (7)$$

Based on the above expressions (7), the absolute value of the torque T is equal to an area S of a triangle of which one side is vector Φg and another side is Iq on the q-axis, as shown in FIG. 4.

Here let us suppose that q-phase current is increased from Iq to Iq'. Thereupon, the stator-side magnetic flux becomes M·Iq', so that the effective magnetic flux becomes Φg'(= ΦM+M·Iq'), and the absolute value of a generated torque T' is equal to an area S' of a triangle of which one side is Φg' and another side is Iq' on the q-axis, as shown in FIG. 4. In FIG. 4, the area S' is larger than the area S.

As q-phase current is increased in this manner, generated torque T becomes greater. If q-phase current is increased further, however, effective magnetic flux Φg additionally increases, so that magnetic saturation is inevitably caused in a magnetic circuit in the motor. When the effective magnetic flux Φg thus has entered its magnetic saturation region, though q-phase current Iq is increased further, the effective magnetic flux Φg will not increase any more in proportion to an increment of the q-phase current. Accordingly, the increment of the generated torque T is reduced.

In the magnetic flux vector diagram of FIG. 5, the portion hatched with vertical lines schematically indicates the magnetic saturation region. In FIG. 5, a magnetic flux Φg (=ΦM+M·Iq1) that is formed on the basis of an increased q-phase current Iq1 is in the magnetic saturation region. As a result, the magnetic flux actually formed by the magnetic saturation becomes Φgs, which is smaller than Φg. Thus, the torque actually generated under the influence of the magnetic saturation is equal to an area S1 of a triangle of which one side is vector Φgs and another side is Iq1 on the q-axis, as shown in FIG. 5. If the torque were not influenced by the magnetic saturation, it would be equal to an area S1+S2 (S2: increment) of a triangle of which one side is vector Φg and another side is Iq1 on the q-axis, as shown in FIG. 5. Thus, the magnetic flux Φg based on the q-phase current Iq1 inevitably enters the magnetic saturation region, so that the actually generated torque is reduced to S1/(S1+S2) as large as a torque to be obtained when remaining outside the magnetic saturation region.

Accordingly, the magnetic saturation correction according to the present invention is characterized in that the magnetic flux Φg is controlled so as not to enter the magnetic saturation region by advancing the phase of the q-phase current Iq, whereby reduction of the torque component is restrained. Referring now to FIG. 6, this method will be described.

In the magnetic flux vector diagram of FIG. 6, the q-phase current Iq1 in the direction of the q-axis and the magnetic flux Φgs formed by the q-phase current Iq1 are identical with the ones shown in FIG. 5. The magnetic flux Φgs has already reached the magnetic saturation region.

In this state, the phase of the q-phase current Iq1 is advanced by angle θ without changing its absolute value. More specifically, a q-phase current designated by Iq1(θ) in FIG. 6 is supplied. Thereupon, a magnetic flux Φgs(θ) (=ΦM+M·Iq1(θ)) that is formed on the basis of the q-phase current Iq1(θ) of the advanced phase is not in the magnetic saturation region yet. Therefore, it is apparent that when the phase of the q-phase current is advanced by θ, the value of the current can still afford to increase.

In consequence, if the value of the q-phase current Iq1(θ) is increased till the point of time just before the magnetic flux Φgs(θ) formed by the q-phase current Iq1(θ) enters the magnetic saturation region, the generated torque T can be increased from the value corresponding to the area S1 (area of a triangle of which one side is Iq1(θ) and another side is Φgs(θ)) in FIG. 5 by a margin corresponding to an area S3 of a quadrilateral.

Although the area S3 of the quadrilateral in FIG. 6, that is, a torque increment obtained by advancing the phase of the q-phase current, is generally smaller than the area shown in FIG. 5, it serves for the increase of the torque.

Actually, the phase advance of the q-phase current can be controlled by advancing the rotor phase detected by means of the encoder so that d-q coordinates for control are advanced with respect to actual d-q coordinates. The manner of control viewed from the point of the control system is the same as that of a conventional control, except for the phase delivered from the rotor phase block 7 (see FIG. 3).

Figure 7A:
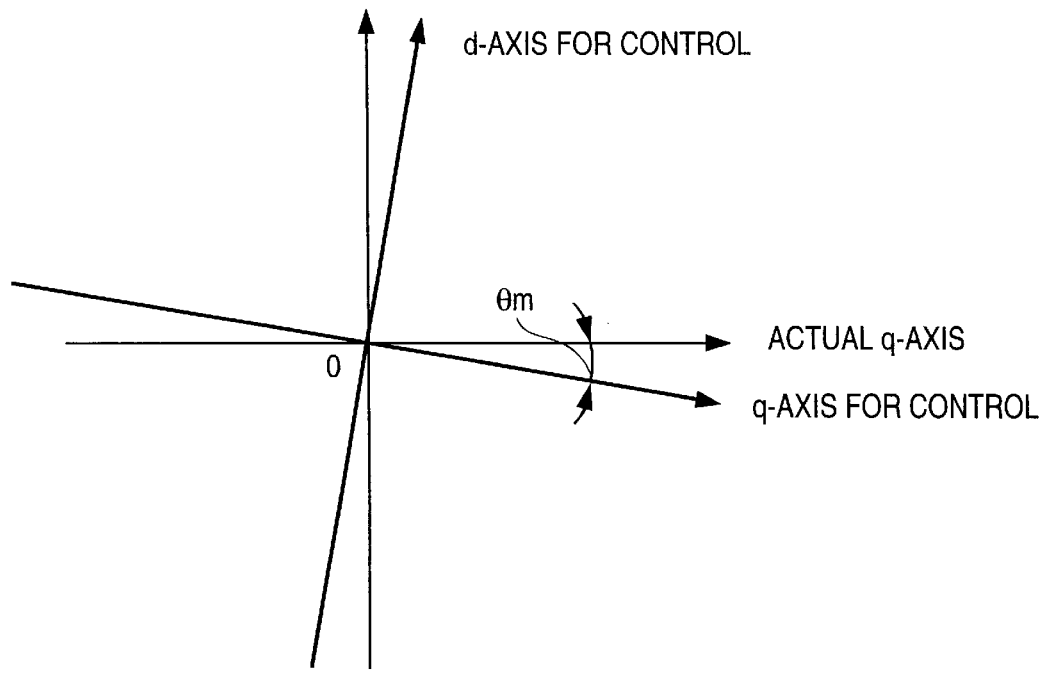
FIG. 7A is a diagram indicating that d-q coordinates for control are advanced in phase with respect to actual d-q coordinates.
Figure 7B:
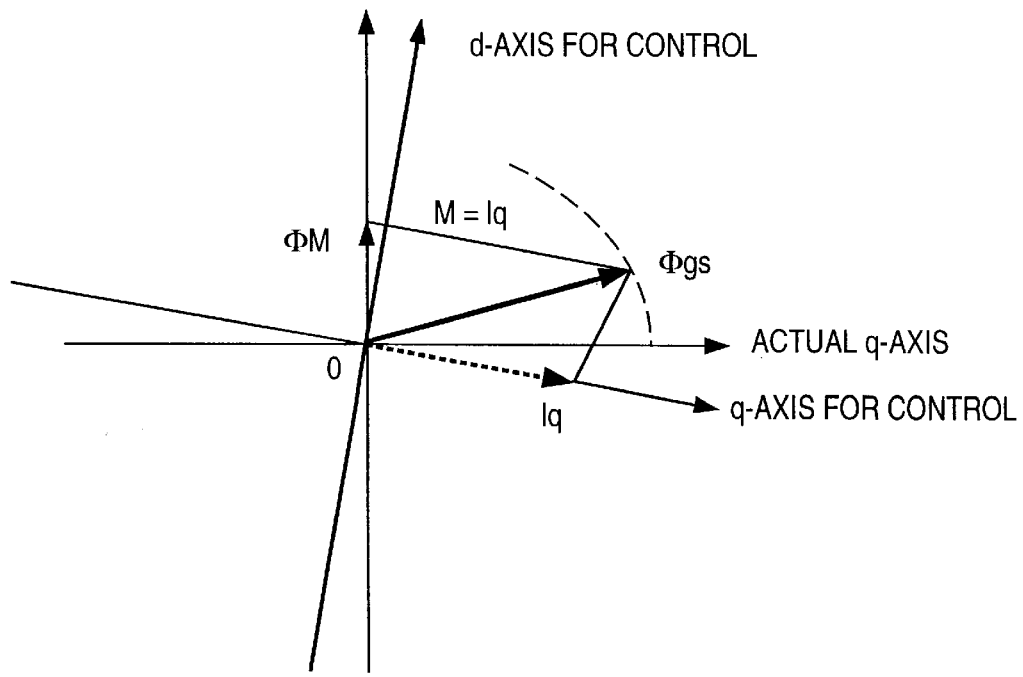
FIG. 7B illustrates a control according to a control system which is carried out on the d-q coordinates for control shown in FIG. 7A.

Referring now to FIGS. 7A and 7B, therefore, relations between the d-q coordinates for control and the actual d-q coordinates will be described.

FIG. 7A indicates that the d-q coordinates for control are advanced in phase by θm with respect to the actual d-q coordinates. Further, FIG. 7B illustrates a control by the control system which is carried out on the d-q coordinates for control shown in FIG. 7A. The magnetic saturation can be corrected by causing the q-phase current to flow in the direction of the q-axis of the d-q coordinates for control. Consequently, it can be said that such control is not different from a conventional one, as far as viewed from the point of control system.

Figure 8:
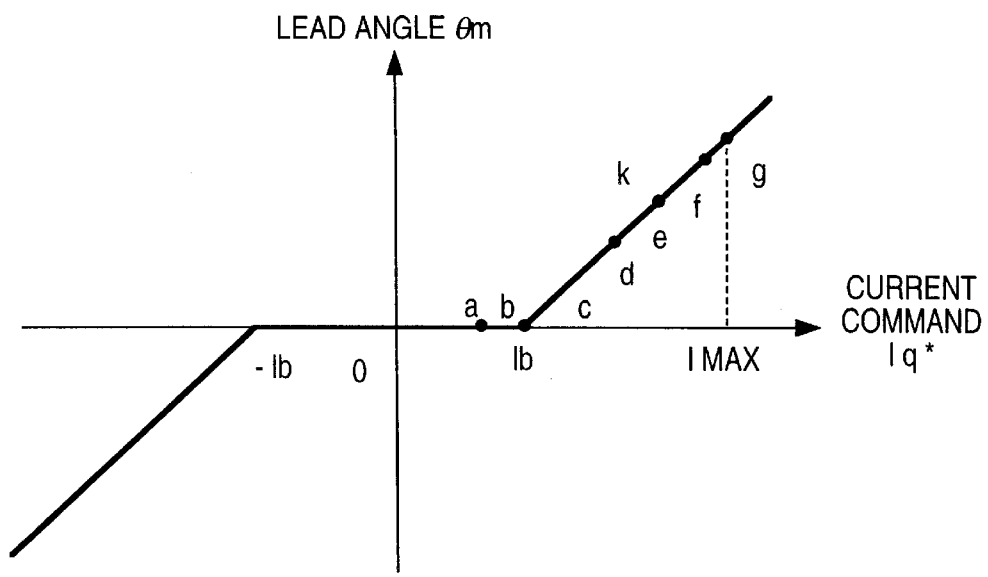
FIG. 8 is a diagram for illustrating the relation between a current command and a phase-lead angle.

Referring now to FIG. 8, the phase lead angle θm in the magnetic saturation correction according to the present invention will be described.

FIG. 8 illustrates an example of a method for setting the lead angle θm according to the current command Iq*.

In FIG. 8, the read angle θm is reduced to 0° in the case where the current command Iq* is not higher than a preset value 1b. If the current command Iq* exceeds the preset value 1b, the lead angle is increased in proportion to the current command Iq*. The lead angle θm shown in FIG. 8 is given by the following expression (8):

$$\theta m = k \cdot (abs(Iq^*) - Ib) \cdot sign(Iq^*), \text{ in the case where } abs(Iq^*) > Ib, \text{ or}$$
$$\theta m = 0, \text{ in the case where } abs(Iq^*) < Ib. \quad (8)$$

Here Iq* is the q-phase command current, Ib is a current value for assigning the value of the current command that starts to enter the magnetic saturation region, k is a proportional constant, abs represents an absolute value, and sign represents a sign. In this case, the proportional constant k is a coefficient of magnetic saturation, which is determined according to a magnetic saturation characteristic which is proper to individual motor, and can be settled by experiment.

In the case where the current command Iq* is so small that the generated magnetic flux cannot enter the magnetic saturation region with this value of the current command, therefore, the magnetic saturation need not be corrected, the motor control is carried out with the lead angle θm set to 0° without controlling the phase of the current command Iq*. In the case where the current command Iq* is enhanced so that the magnetic flux generated in response to this current command enters the magnetic saturation region, on the other hand, the magnetic saturation must be corrected, so that control for advancing the phase is carried out with the lead angle θm corresponding to the degree of magnetic saturation. This phase advancing according to the degree of magnetic saturation can be set taking into account how far (Iq*−Ib) the current command Iq* exceeds the value Ib of the current command at which it starts to enter the magnetic saturation region.

Figure 9:
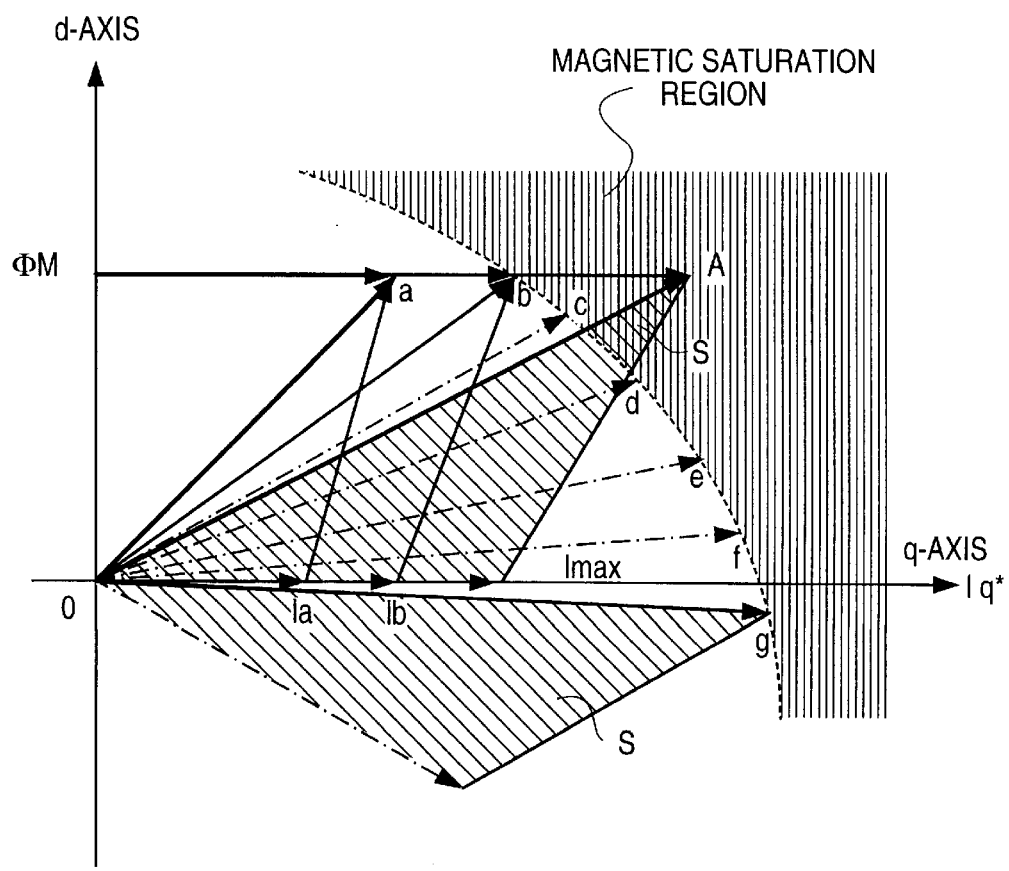
FIG. 9 is a diagram illustrating transition of an effective magnetic flux Φ g when the phase of the current command is advanced.

Referring now to FIG. 9, the relation between the phase advance and the effective magnetic flux will be described.

In FIG. 9, vectors a, b, c, d, e, f and g represent the magnetic flux Φg that is formed when the relation between the current command Iq* and the lead angle Φm is established on points a, b, c, d, e, f and g of FIG. 8. In the case (symbol a) where a current command Iq* is at Ia, which is smaller than Ib, for example, generated magnetic flux has not reached the magnetic saturation region yet, so that the current control is carried out without advancing the phase with the lead angle θm set to 0°. In the case (symbol b) where the current command Iq* is increased to Ib, the generated magnetic flux reaches the magnetic saturation region. For a current command Iq* which has not reached the magnetic saturation region yet, therefore, the current control is carried out without advancing the phase with the lead angle θm set to 0°.

In the case where the current command Iq* is increased to exceed Ib, moreover, the generated magnetic flux enters the magnetic saturation region, so that the generated torque would be restrained if nothing were dealt with. Thereupon, the lead angle θm is increased from the point of time when the current command Iq* is increased to exceed Ib, and control is carried out so that the phase may advance from c to g in FIG. 9 in turn with the generated torque kept close to the border of the magnetic saturation region. By doing this, the magnetic flux can be restrained from entering the magnetic saturation region so that the generated torque can be increased. As the phase of the q-phase current is advanced, a d-phase current component is generated. This d-phase current component is consumed as a loss such as heat.

Referring now to the block diagram of FIG. 10, a servomotor control system to which an embodiment of the present invention is applied will be described. Since the configuration of the control system is identical with a conventional device which carries out digital servo control, it is illustrated here schematically.

Figure 10:
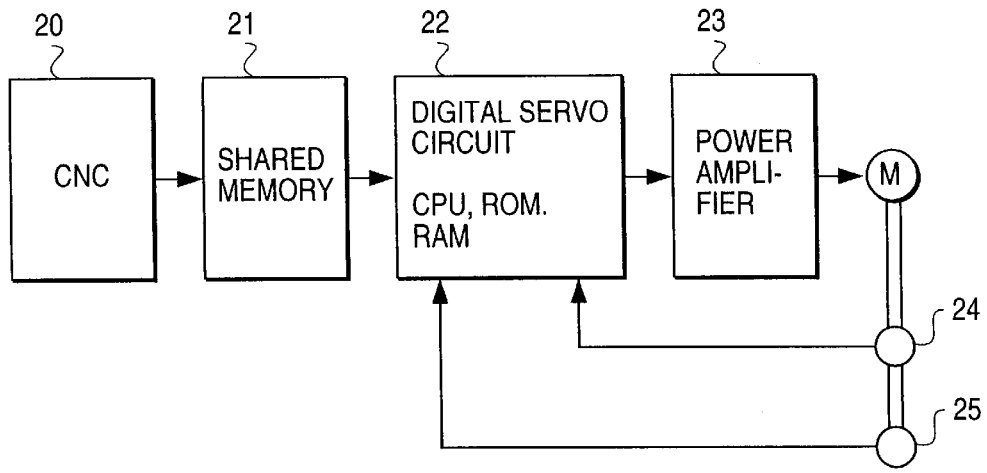
FIG. 10 is a block diagram of a digital servo system according to one embodiment of the present invention.

In FIG. 10, reference numeral 20 denotes a numerical control device (CNC) having a computer therein; 21, a shared memory; 22, a digital servo circuit having a processor (CPU), ROM, RAM, etc.; 23, a power amplifier such as a transistor inverter; M, an AC servomotor; 24, an encoder for generating pulses as the AC servomotor M rotates; and 25, a rotor position detector for detecting the rotor phase.

Figure 11:
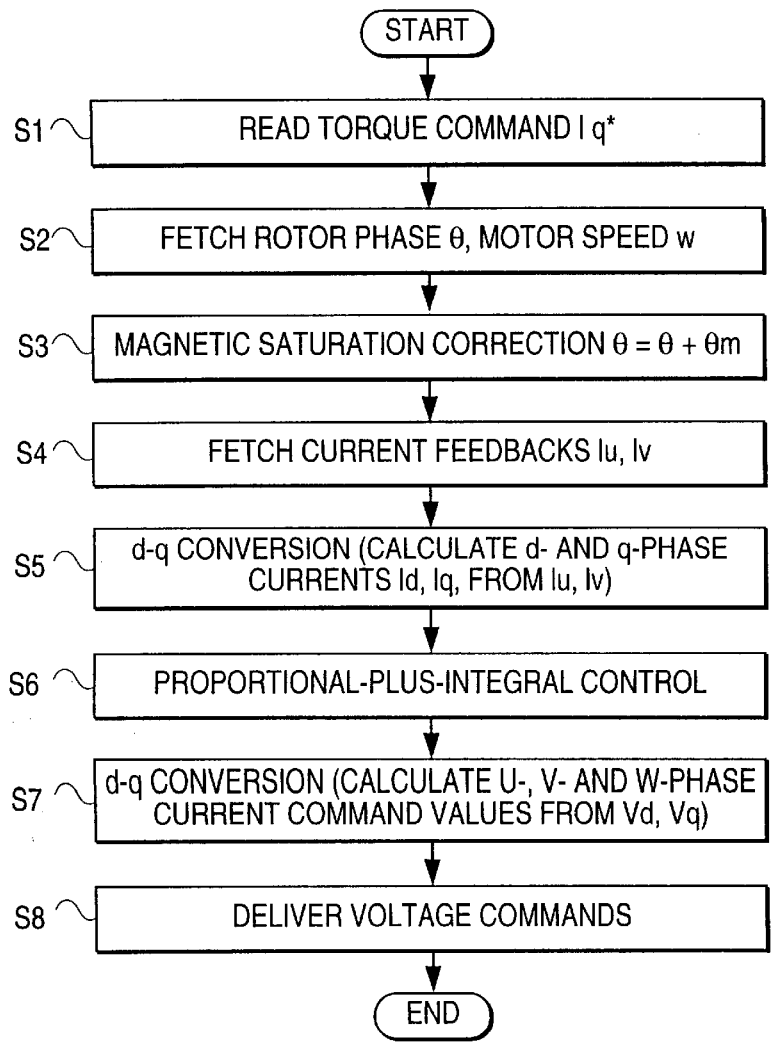
FIG. 11 is a flowchart showing a current loop process carried out by a processor of the digital servo circuit according to the present invention.

Referring now to the flowchart of FIG. 11, a current loop control process, which is carried out with every predetermined cycle by the processor of the digital servo circuit 22, will be described. The processor of the digital servo circuit 22 reads a position command (or velocity command) delivered from the numerical control device (CNC) by means of the shared memory 21, carries out a position loop process and a velocity loop process, generates the torque command (current command), reads the current command (torque command) Iq* outputted by the velocity loop process (Step S1), and moreover, fetches the rotor phase θ and a motor speed w from the rotor position detector 25 (Step S2).

Then, in the rotor phase block, computation for the magnetic saturation correction for advancing the phase of the current command (torque command) is carried out depending on the value of this command. This magnetic saturation correction computation is a computation for obtaining the lead angle θm according to the aforesaid expression (8), whereby the lead angle θm corresponding to the value of the current command is obtained (Step S3).

In a current loop, moreover, the u- and v-phase current feedbacks Iu and Iv are fetched (Step S4), and computation of the aforesaid expression (6) using the rotor phase θ obtained in Step S2 is carried out, whereupon the two phase currents Id and Iq are obtained from the three phase currents Iu, Iv and Iw and are used as current feedbacks for the individual phases (Step S5). Then, the d-phase command voltage Vd is obtained by carrying out a conventional current loop process proportional-plus-integral control) using the obtained d-phase current Id as a feedback current and the d-phase current command at "0", while the q-phase voltage command Vq is obtained by carrying out a current loop process using the current command read in Step S1 as a current command and the q-phase current value Iq calculated in Step S5 as a feedback current. The q-phase current value Iq used here is a value that is subjected to control for phase advancing based on the magnetic saturation correction (Step S6).

The two-phase-to-three-phase converter 8 carries out d-q conversion on the basis of the computation according to the aforesaid expression (5), thereby obtaining the three phase voltages Vu, Vv and Vw to be voltage commands from the two phase voltages Vd and Vq commands (Step S7). The obtained voltage command outputs are delivered to the power amplifier 6, which carries out PWM control by means of an inverter or the like, and supplies the currents for the individual phases to the AC servomotor 4, thereby driving it.

Figure 12:
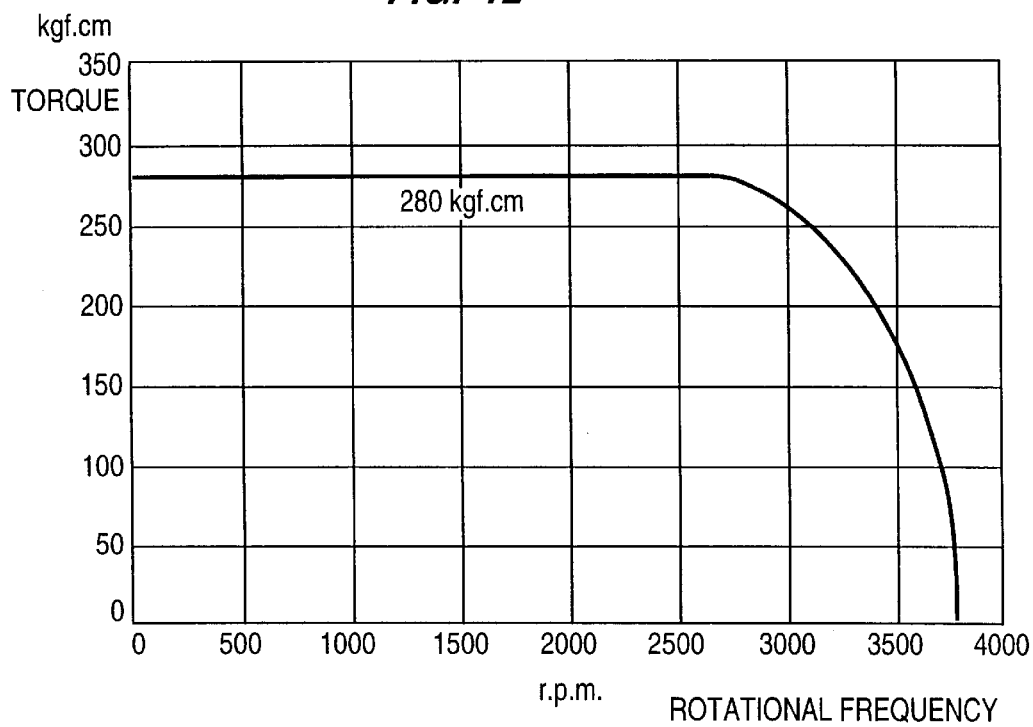
FIG. 12 is a graph showing the relation between rotational speed and torque according to a conventional control method for an AC servomotor.
Figure 13:
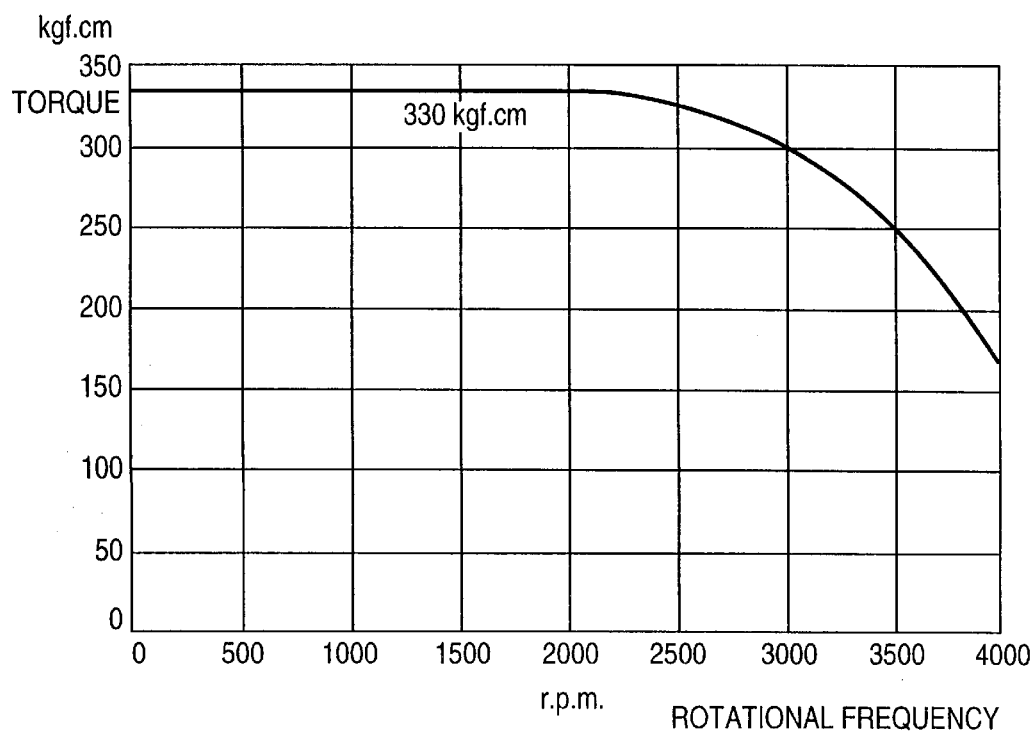
FIG. 13 is a graph showing the relation between rotational speed and torque according to the current control method for an AC servomotor of the present invention.
Figure 14:
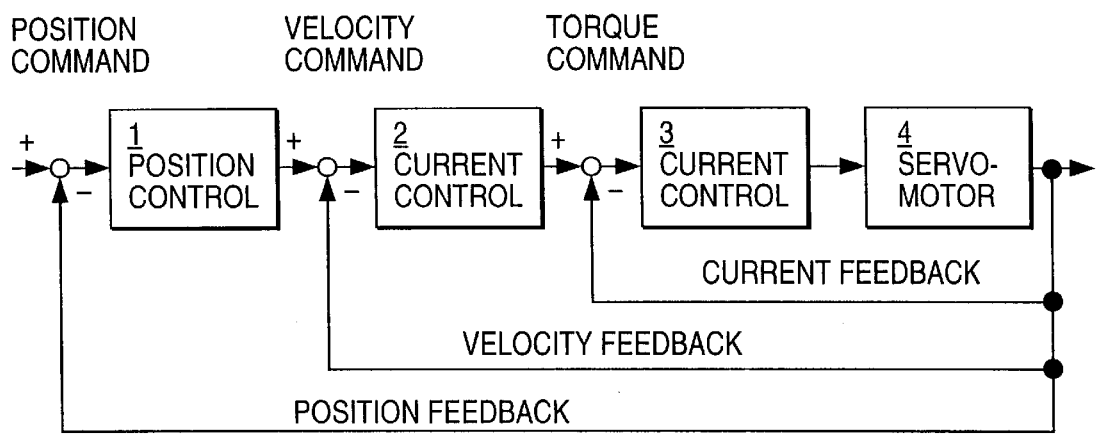
FIG. 14 is a block diagram of a conventional AC servomotor control system.
Figure 15:
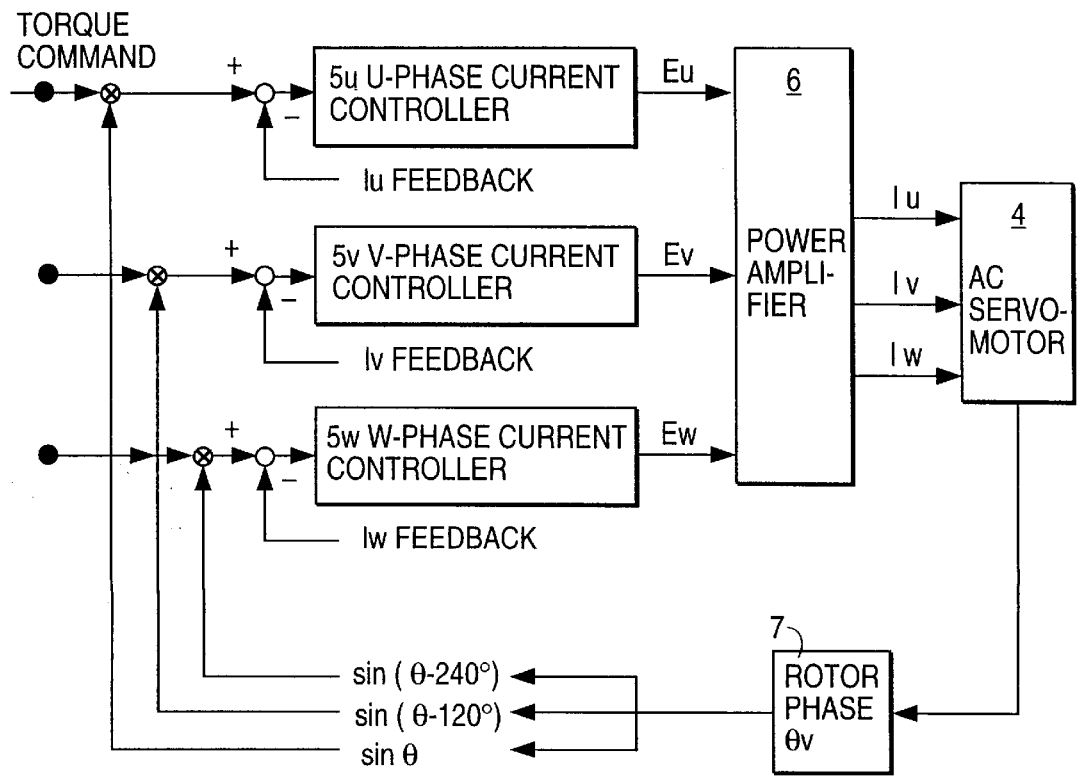
FIG. 15 is a detailed diagram showing a current loop process for separately controlling three phase currents of the conventional AC servomotor control system for individual phases.
Figure 16:
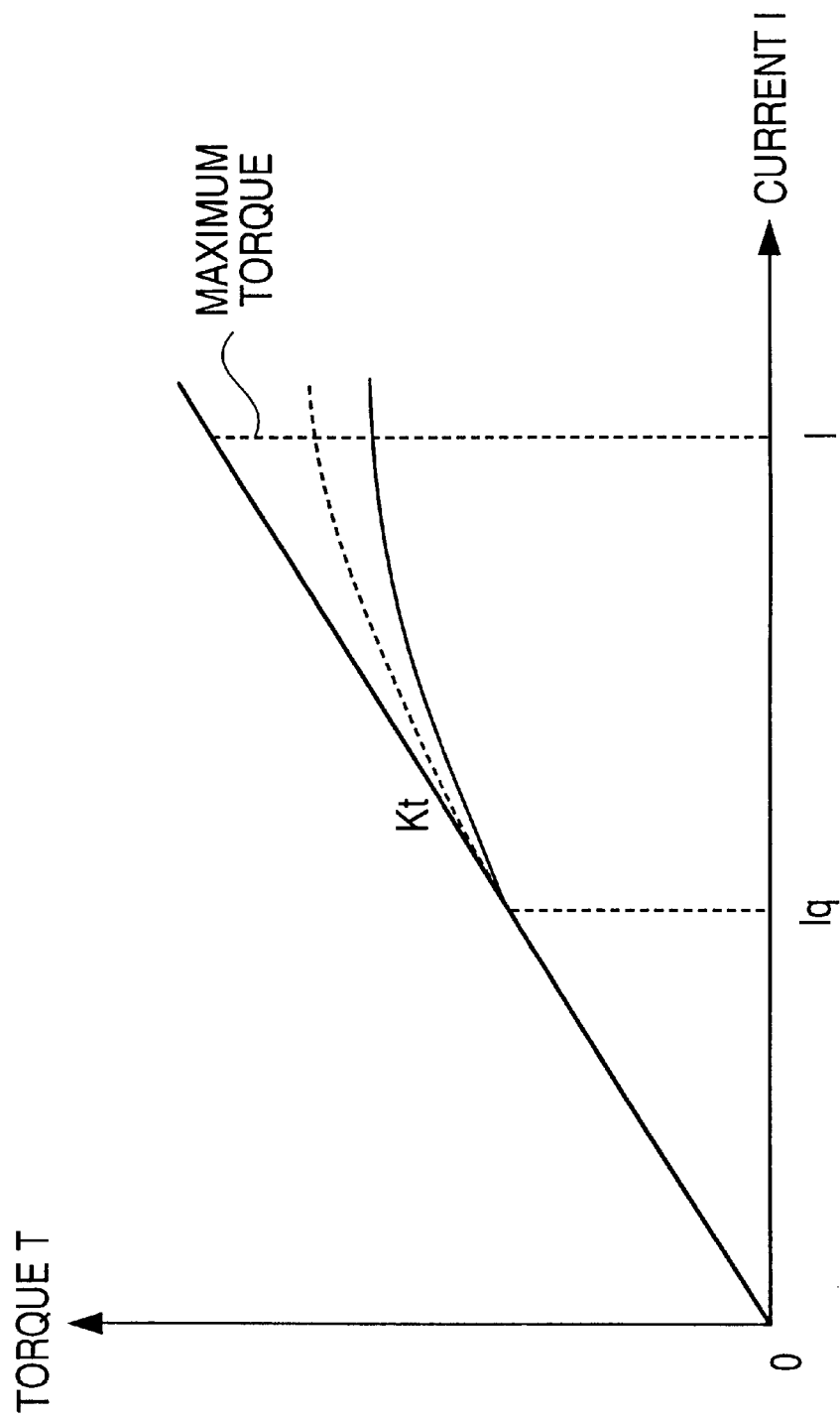
FIG. 16 is a diagram for illustrating the relation between supply current and torque of a conventional AC servomotor.

Referring now to FIGS. 12 and 13, the conventional control system and the magnetic saturation correction system according to the present invention will be compared.

FIGS. 12 and 13 are torque characteristic diagrams showing relations between rotational frequency and torque, and illustrate examples of the maximum output for each rotational frequency of the motor. FIG. 12 shows an example of a torque characteristic based on conventional AC-mode control, and FIG. 13 shows an example of a torque characteristic based on the control by the magnetic saturation correction system according to the present invention. According to the magnetic saturation correction system of the present invention, the maximum torque for high-speed rotation can be enhanced.

We claim:

1. A current control method for an AC servomotor, said method comprising the steps of:

obtaining a d-phase current in the direction of a magnetic flux generated by a field system and a q-phase current in a direction perpendicular thereto from a driving current and obtaining a rotor phase of the AC servomotor by d-q conversion;

adjusting a d-phase current command to zero;

setting a q-phase current command as a torque command to be delivered from a velocity loop;

obtaining a d-phase command voltage from the d-phase current command and the d-phase current, and obtaining a q-phase command voltage from the q-phase current command and the q-phase current;

converting the d- and q-phase command voltages into three phase voltages; and obtaining three phase currents to be supplied to the motor from the three phase voltages;

wherein the phase of said q-phase current command is advanced by an angle corresponding to the value of the q-phase current command.

2. A current control method for an AC servomotor according to claim 1, wherein the phase of said q-phase current is advanced by advancing the rotor phase detected by means of an encoder.

3. A current control method for an AC servomotor according to claim 1, wherein said q-phase current command is not advanced in phase when the value thereof is not within a magnetic saturation region, but is advanced in phase corresponding to the value of an excess over the magnetic saturation region when the command value is within the magnetic saturation region.

4. A three-phase AC servomotor control apparatus, comprising:

a plurality of phase-current detecting means for detecting actual current for at least two phases of a three-phase AC servomotor;

position detecting means for detecting the phase of a rotor of said servomotor;

three-phase-to-two-phase converter means adapted to receive the respective outputs of said phase-current detecting means and said phase detecting means and output a d-phase current in the direction of a magnetic flux generated by a field system three-phase AC servomotor control apparatus and a q-phase current in a direction perpendicular thereto;

d-phase current control means for obtaining and outputting a d-phase command voltage from a deviation between a d-phase current command and said d-phase current;

q-phase current control means for obtaining and outputting a q-phase command voltage from a deviation between a q-phase command voltage and said q-phase current;

two-to-three-phase converter means adapted to receive the outputs from said d-phase current control means and said q-phase current control means and convert the outputs into voltages for the three phases of the AC servomotor;

power amplifier means adapted to receive the output from said two-to-three-phase converter means and convert the output into current for the three phases of the AC servomotor; and magnetic saturation correcting means adapted to receive the q-phase current command and output a lead angle corresponding to the value of the q-phase current command to said phase detecting means, said phase detecting means being adapted to deliver to said three-phase-to-two-phase converter means the sum of the rotor phase of the AC servomotor detected thereby and the lead angle received from said magnetic saturation correcting means.

* * * * *